Nov. 13, 1928.

J. L. WOODBRIDGE

STORAGE BATTERY

Filed Sept. 30, 1925

1,691,794

WITNESS:
Rob't W. Kitchel.

INVENTOR
Joseph Lester Woodbridge
BY
Augustus B. Stoughton
ATTORNEY.

Patented Nov. 13, 1928.

1,691,794

UNITED STATES PATENT OFFICE.

JOSEPH LESTER WOODBRIDGE, OF PHILADELPHIA, PENNSYLVANIA.

STORAGE BATTERY.

Application filed September 30, 1925. Serial No. 59,467.

My invention relates to storage batteries, and particularly to cells in which the element is assembled in a cylindrical container and is made up of sheets of lead rolled into cylindrical form.

One of the objects of my invention is to provide suitable separators between the lead sheets forming the electrodes of such a cell.

For certain purposes it is desirable in designing a cell of this general construction, to obtain very low internal resistance by using for the electrodes thin sheets of lead of very considerable area closely packed together so as to secure a maximum electrode surface and a minimum distance between the electrodes of opposite polarity in a given space. A cylindrical form for such a cell has certain advantages, especially in permitting the use of a container of glass or similar material in a shape that is inexpensive to manufacture. In order to utilize to the fullest extent the space available in such a cylindrical container, it is desirable that the element shall be in cylindrical form and this is best attained by making up the element in the form of two sheets of lead, separated by suitable separators and rolled up into a compact cylinder.

For certain applications very little, if any, capacity is required in such a cell, as the cell may be used merely to act as a counter electromotive force, or as a true storage cell but of very small capacity sufficient to smooth out the ripples in a pulsating current of high frequency.

It is well known that wood diaphragm separators when properly treated to remove compounds which might prove injurious to the plates have very advantageous characteristics as separators for ordinary storage cells having flat plates. Such separators, however, as ordinarily prepared could not be used where the electrodes are to be rolled into cylindrical form. I find, however, that properly selected wood veneers cut to a thickness of approximately $\frac{1}{32}''$ and then thoroughly soaked in water or electrolyte, preferably hot, may be used for this purpose if the grain of the veneer is parallel to the axis of the rolled cylinder.

Figure 1:
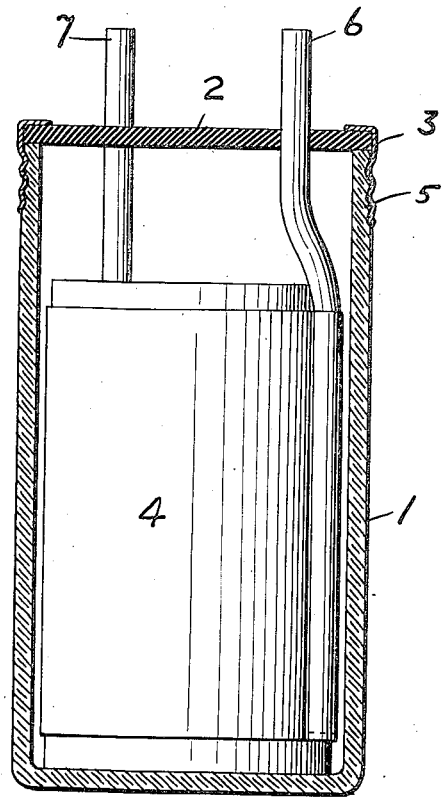
Figure 2:
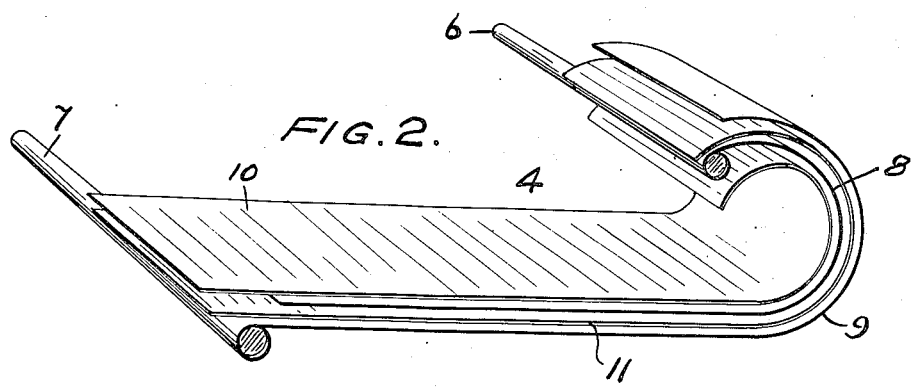

My invention will be better understood by reference to the accompanying drawings in which Figure 1 is an elevation, partly in section, of a cell involving features of my invention, and Fig. 2 is a perspective view of the electrodes and separators partly unrolled.

In Fig. 1, 1 is a container of glass or other suitable material, cylindrical in form, and provided at the top with external screw threads 5. 2 is a cover or closure of resilient material such as soft rubber held in place on top of the container by means of the collar or ring 3, which may be of metal, and which is provided with interior screw threads adapted to engage with the threads at the top of the container and thus clamp and hold the cover 2 in position. The element 4 consists of two sheets of lead provided respectively with terminal posts 6 and 7, which project through suitable openings in the cover 2. Details of the element 4 may be more clearly seen in Fig. 2, in which this element is partly unrolled. The two electrodes 8 and 9 consist of flat sheets of lead provided at opposite ends with terminals 6 and 7. These lead sheets are separated by thin wood veneers 10 and 11, which are of somewhat greater dimensions in width and length than the lead sheets, so as to extend beyond them at the top and bottom when the element is rolled into its final cylindrical form, and to prevent the electrodes of opposite polarity from coming into contact with each other at the ends, as well as throughout their entire length. As stated above, in order to permit these wood veneers being rolled into cylindrical form with the lead sheets they should be cut very thin, and I find that a thickness of about $\frac{1}{32}''$ is suitable in order that they may not split or crack. It is also desirable that they be thoroughly soaked, preferably in hot water or hot electrolyte for some hours before they are assembled into the elements. This makes them exceedingly pliable.

By desiging the wood veneers of a width greater than the width of the lead sheets they will extend somewhat below the latter at the bottom and if tightly rolled they can be used to support the element in the jar with the lead sheets out of contact with the bottom of the jar. This permits a small amount of space between the lower edges of the lead sheets and the bottom of the jar for the collection of sediment.

After the element is assembled in the container and electrolyte added consisting of dilute sulphuric acid, a certain amount of active material may be formed on the surface of the lead sheets by passing current through the cell in accordance with the well known Planté process.

I claim:

1. An element for a storage battery cell comprising two electrodes of sheet lead and thin wood veneer spacing said electrodes, and the electrodes and veneer rolled into cylindrical form with the grain of the veneer substantially parallel with the axis of the cylinder.

2. An element for a storage battery cell comprising two electrodes of sheet lead, wood veneers of approximately $\frac{1}{32}''$ thickness spacing said electrodes, and the electrodes and veneer rolled into cylindrical form with the grain of the veneer substantially parallel with the axis of the cylinder.

3. The combination in a storage battery cell of a cylindrical container and an element assembled therein comprising alternate layers of sheet lead and wood veneer rolled into cylindrical form with the grain of the veneer parallel with the axis of the cylinder.

4. The combination in a storage battery cell of a container and an element assembled therein comprising alternate layers of sheet lead and wood veneer rolled into cylindrical form with the grain of the veneer parallel with the axis of the cylinder, said veneer extending below the sheet lead to support same out of contact with the bottom of the container.

JOSEPH LESTER WOODBRIDGE.